United States Patent
Fritz et al.

(10) Patent No.: US 9,412,984 B2
(45) Date of Patent: Aug. 9, 2016

(54) MOTOR VEHICLE BATTERY

(71) Applicants: Dr. Ing. h.c. F. Porsche Aktiengesellschaft, Stuttgart (DE); Samsung SDI Co., Ltd., Yongin-si, Gyeonggi-do (KR); Robert Bosch GmbH, Stuttgart (DE)

(72) Inventors: Thomas Fritz, Loechgau (DE); Alexander Klausmann, Schoenaich (DE); Klaus Wipfler, Niefern-Oeschelbronn (DE); Claus Gerald Pflueger, Markgroeningen (DE)

(73) Assignees: Dr. Ing h.c.F. Porsche Aktiengesellschaft, Stuttgart (DE); Robert Bosch GmbH, Stuttgart (DE); Samsung SDI Co., Ltd., Yongin-si (KR)

( * ) Notice: Subject to any disclaimer, the term of this patent is extended or adjusted under 35 U.S.C. 154(b) by 90 days.

(21) Appl. No.: 13/961,023

(22) Filed: Aug. 7, 2013

(65) Prior Publication Data

US 2014/0045025 A1   Feb. 13, 2014

(30) Foreign Application Priority Data

Aug. 10, 2012   (DE) .......................... 10 2012 015 817

(51) Int. Cl.
*H01M 2/10* (2006.01)
*B60K 1/04* (2006.01)

(52) U.S. Cl.
CPC .......... *H01M 2/1083* (2013.01); *H01M 2/1077* (2013.01); *B60K 1/04* (2013.01); *B60Y 2306/01* (2013.01); *H01M 2220/20* (2013.01)

(58) Field of Classification Search
CPC ............ H01M 2/1083; H01M 2/1077; H01M 2220/20; B60K 1/04; B60Y 2306/01
See application file for complete search history.

(56) References Cited

U.S. PATENT DOCUMENTS

| | | | | |
|---|---|---|---|---|
| 5,555,950 A | * | 9/1996 | Harada et al. ................ | 180/65.1 |
| 2009/0145676 A1 | * | 6/2009 | Takasaki .................. | B60K 1/04 180/65.1 |

(Continued)

FOREIGN PATENT DOCUMENTS

| | | | |
|---|---|---|---|
| DE | 10 2007 010 738 | | 8/2008 |
| DE | 102009053138 A1 | * | 5/2011 |
| JP | 2007273180 A | * | 10/2007 |

OTHER PUBLICATIONS

Machine translation of DE 102009053138, pp. 1-8.*

(Continued)

*Primary Examiner* — Sarah A Slifka
*Assistant Examiner* — Brian OHara
(74) *Attorney, Agent, or Firm* — Gerald E. Hespos; Michael J. Porco; Matthew T. Hespos

(57) ABSTRACT

A motor vehicle battery has at least one battery module (10) with a plurality of battery cells (11) bounded by battery module walls (12) of the battery module (10). Two opposite battery module walls (12) of the battery module (10) are between walls (14) of a battery housing or walls of a bodywork structure. Deformation elements (15) fasten the battery module walls (12) of the respective battery module (10) indirectly to walls (14) of the battery housing or of the bodywork structure, and the respective wall (14) of the battery housing or of the bodywork structure.

7 Claims, 3 Drawing Sheets

(56) References Cited

U.S. PATENT DOCUMENTS

| | | | |
|---|---|---|---|
| 2009/0236161 A1* | 9/2009 | Meier | B60K 1/04 180/68.5 |
| 2010/0173191 A1 | 7/2010 | Meintschel et al. | |
| 2010/0190044 A1 | 7/2010 | Nishino et al. | |
| 2012/0251862 A1* | 10/2012 | Kano | B60K 1/04 429/99 |
| 2013/0126255 A1* | 5/2013 | Saeki | B60K 1/04 180/68.5 |
| 2013/0192914 A1* | 8/2013 | Nakamori | B60K 1/04 180/68.5 |
| 2014/0014428 A1* | 1/2014 | Yanagi | B60K 1/04 180/68.5 |

OTHER PUBLICATIONS

JP2007273180translation.*
German Search Report of Mar. 4, 2013.

* cited by examiner

MOTOR VEHICLE BATTERY

CROSS REFERENCE TO RELATED APPLICATION

This application claims priority under 35 USC 119 to German Patent Appl. No. 10 2012 015 817.3 filed on Aug. 10, 2012, the entire disclosure of which is incorporated herein by reference.

BACKGROUND

1. Field of the Invention

The invention relates to a motor vehicle battery.

2. Description of the Related Art

Motor vehicle batteries that are used, for example, as energy accumulators or as traction batteries in hybrid vehicles or electric vehicles typically have a plurality of battery modules, and each battery module has a plurality of battery cells.

The battery modules of known motor vehicle batteries are fastened to walls of a battery housing or to walls of a bodywork structure of a motor vehicle via battery module walls that bound the battery cells and therefore bound the respective battery module. High forces act on the motor vehicle battery and the battery modules thereof in the event of a rear end collision. Thus, the battery modules or the battery cells of the battery modules may be damaged.

It is an object of the invention to provide a novel motor vehicle battery.

SUMMARY OF THE INVENTION

The invention relates a motor vehicle battery with deformation elements positioned between the battery module walls and the respective battery modules are fastened to walls of the battery housing or to walls of the bodywork structure via the deformation elements. Thus, the deformation elements indirectly fasten the respective battery module to the battery housing or to the bodywork structure.

Each battery module is fastened indirectly to walls of the battery housing or walls of the bodywork structure via deformation elements. Thus, the battery modules or the battery cells of the battery modules are protected from damage in the event of a traffic accident. The deformation elements can absorb forces and moments and thus protect the battery modules or the battery cells from impermissibly high loads.

Each deformation element is formed in a trough shape or U-shape in cross section with a base wall and side edges. The base wall of each deformation element engages a wall of the battery housing or a wall of the bodywork structure, and the side edges of the deformation element engage on the respective battery module wall. Thus, a clearance is formed between the base wall of the deformation element and the respective battery module wall. Accordingly, the deformation elements are simple and enable high load forces to be absorbed reliably.

The base wall of each deformation element preferably is fastened releasably to a wall of the battery housing or to a wall of the bodywork structure. However, the side edges of the respective deformation element are fastened non-releasably to the respective battery module wall. Thus, the battery modules of the motor vehicle battery can be removed from the walls of the battery housing or from the walls of the bodywork structure and can be fit thereon in a simple manner.

The deformation elements preferably extend transverse to a longitudinal direction of the vehicle for efficiently absorbing forces in the event of traffic accidents.

Exemplary embodiments of the invention are explained in more detail, without being restricted thereto, with reference to the drawing.

DETAILED DESCRIPTION OF THE PREFERRED EMBODIMENTS

The invention relates to a motor vehicle battery that is used as a traction battery or as an electric energy accumulator in a hybrid vehicle or electric vehicle. The motor vehicle battery can be discharged in the motor-drive mode of an electric engine of the motor vehicle and charged in the generator mode.

Figure 1:
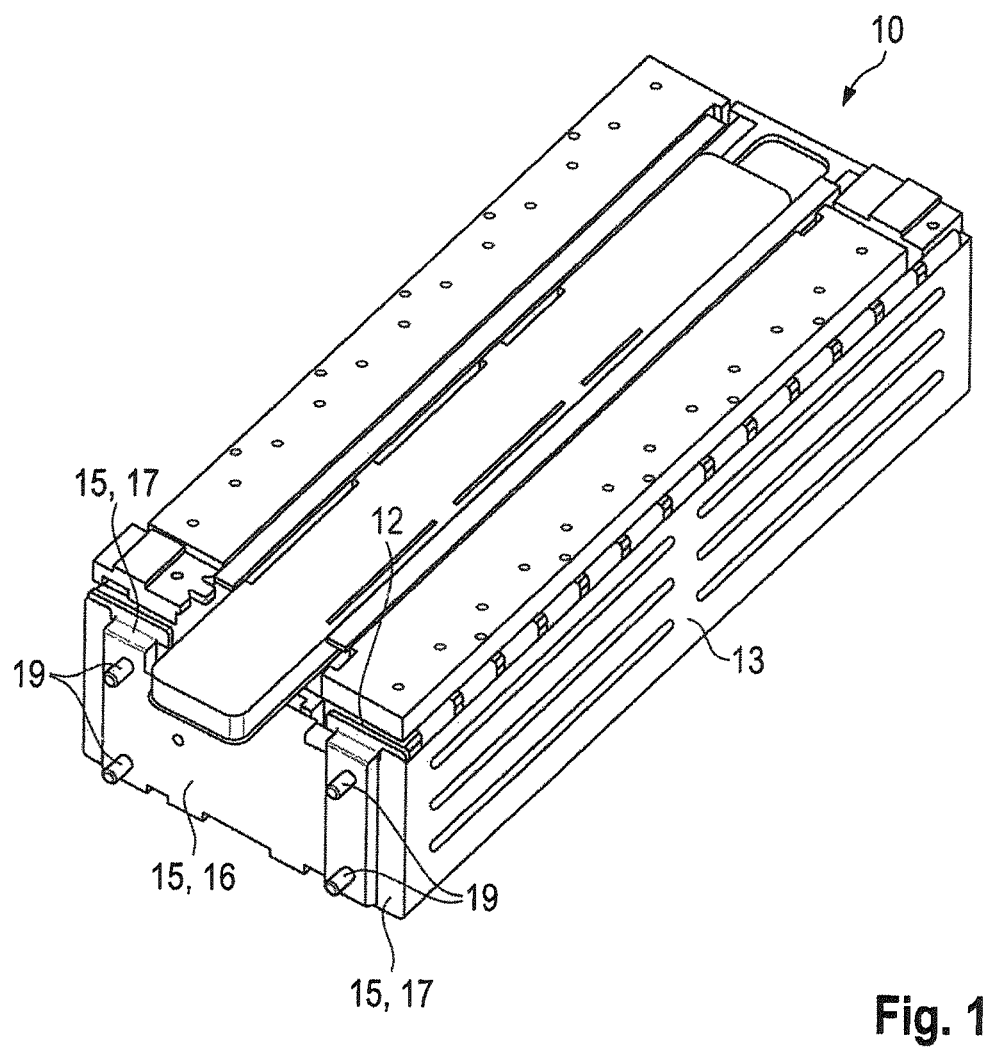
FIG. 1 is a perspective view of a battery module of a motor vehicle battery according to the invention.
Figure 2:
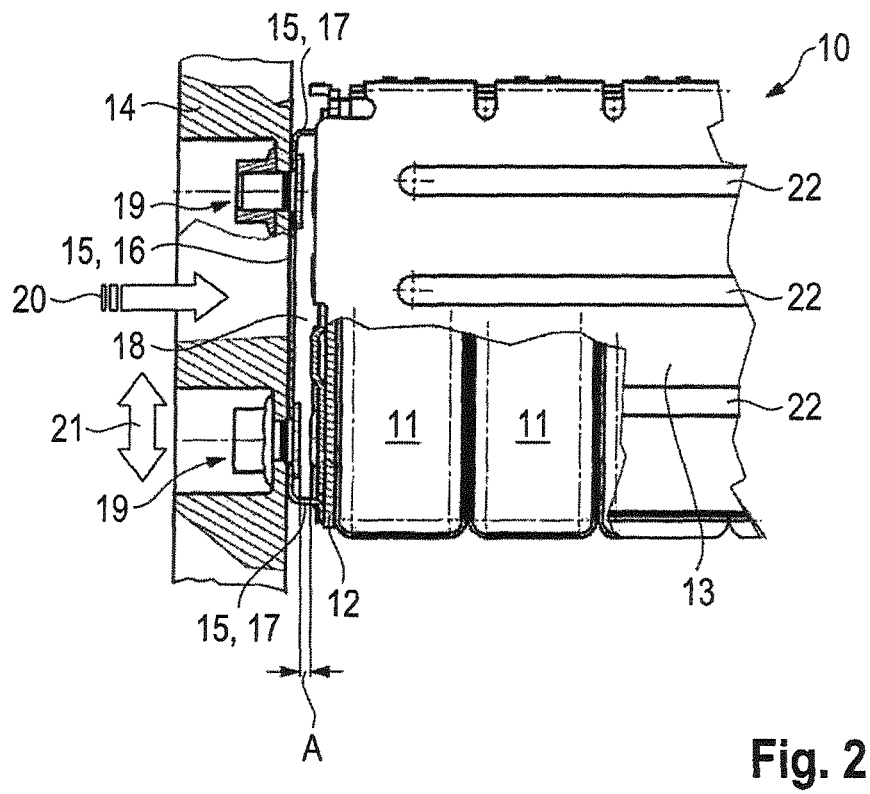
FIG. 2 is part of a side view of the battery module from FIG. 1 together with a wall of a battery housing.
Figure 3:
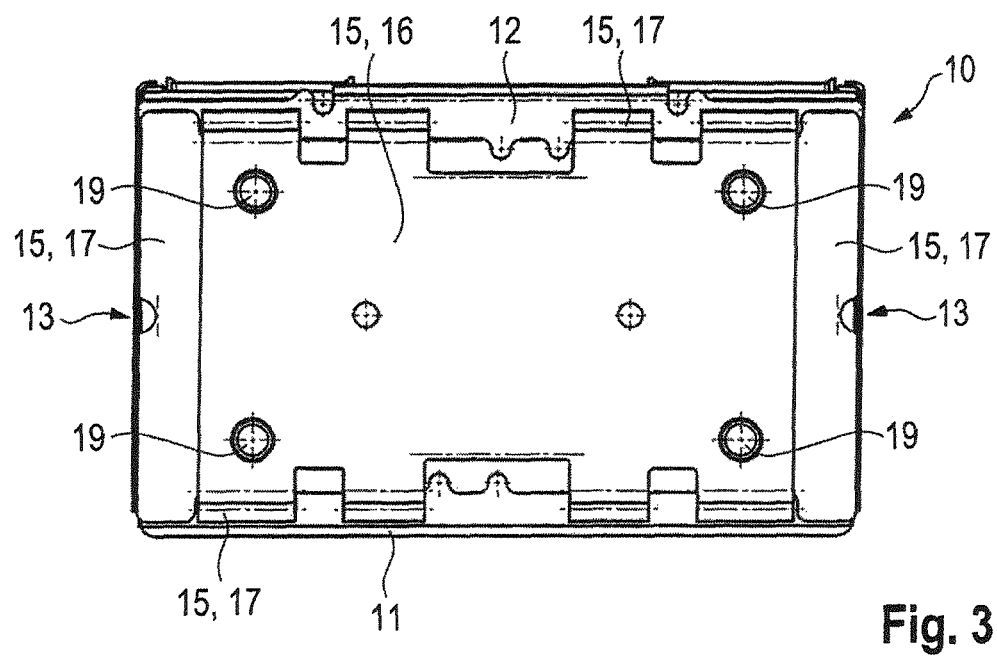
FIG. 3 is the battery module of FIG. 1 in a side view rotated through 90° in relation to FIG. 2.

The motor vehicle battery preferably has a plurality of battery modules 10. FIGS. 1 to 3 show different views of such a battery module 10. The battery module 10 has a plurality of battery cells 11 arranged one behind another or next to one another in a stacked array.

The battery module 10 has battery module walls 12 and 13 that laterally bound the battery cells 11 and therefore the battery module 10. The battery module walls 12 and 13 are parallel to the side walls of such a stack of battery cells 11 and therefore are on the side walls of the battery module 10.

First battery module walls 12 extend on two opposite sides of the respective battery module 10 and extend transverse to the longitudinal direction of the motor vehicle when the motor vehicle battery is fit in the motor vehicle.

Second battery module walls 13 extend on two other, opposite sides of the respective battery module 10 and extend in the longitudinal direction of the motor vehicle when the motor vehicle battery is fit in the motor vehicle.

The battery modules 10 of a motor vehicle battery are fastened to walls 14 of a battery housing or to walls of a bodywork structure of the motor vehicle. The walls 14, only one of which is shown in FIG. 2, extend parallel to the battery module walls 12, which extend transverse to the longitudinal direction of a motor vehicle in the fitted state of the motor vehicle battery. The battery modules 10 are not fastened directly to the walls 14 of the battery housing or of the bodywork structure by the battery module walls 12, but rather indirectly via a deformation element 15.

Each deformation element 15 is trough-shaped or U-shaped in cross section with a base wall 16 and side walls 17. The base wall 16 of each deformation element 15 engages on the respective wall 14 of the battery housing or of the bodywork structure.

By contrast, the side walls 17 of each deformation element 15 engage on the respective battery module wall 12 so that a clearance 18 (see FIG. 2) is formed between the base wall 16 of the deformation element 15 and the battery module wall 12.

The clearance 18 can be used as a deformation clearance for deforming the deformation element 15 if high forces act on the motor vehicle battery or the battery modules 10 in the event of a traffic accident. Forces and moments or kinetic energy can be absorbed by the deformation element 15 to protect the battery cells 11 of the respective battery module 10 from damage.

The base wall 16 of each deformation element 15 is fastened releasably to the respective wall 14 of the battery housing or the wall of the bodywork, for example, via fastening bolts 19. By contrast, the side walls 17 of the deformation element 15 are connected non-releasably to the respective battery module wall 12 of the respective battery module 10, in particular by welding. Thus, each battery module 10 can be fit to and removed from the walls 14 of the battery housing or of the bodywork structure in a simple manner via the deformation elements 15.

The deformation potential provided by the respective deformation element 15 in the event of a crash is visualized in FIG. 2 by a dimension A, which substantially corresponds to the distance between the base wall 16 of the deformation element 15 and the battery module wall 12 or between the fastening bolts 19 and the battery module wall 12 of the respective battery module 10.

Forces acting on the battery module 10 of the motor vehicle battery in the event of a crash are visualized by an arrow 20 in FIG. 2. An arrow 21 visualizes forces that act on the battery modules 10 of the motor vehicle battery during normal operation, i.e. during a journey.

As shown in FIG. 2, the battery module walls 13 have ribs 22 that extend in the longitudinal direction of the motor vehicle and extend over all of the battery cells 11 of the respective battery module 10. The battery cells 11 are positioned one behind another or next to one another in a stacked array. Thus, the individual battery cells 11 can be compressed via the ribs 22, which are formed on the two opposite battery module walls 13, to form the respective battery module 10 so that the battery cells can be guided and accommodated reliably.

Figure 4:
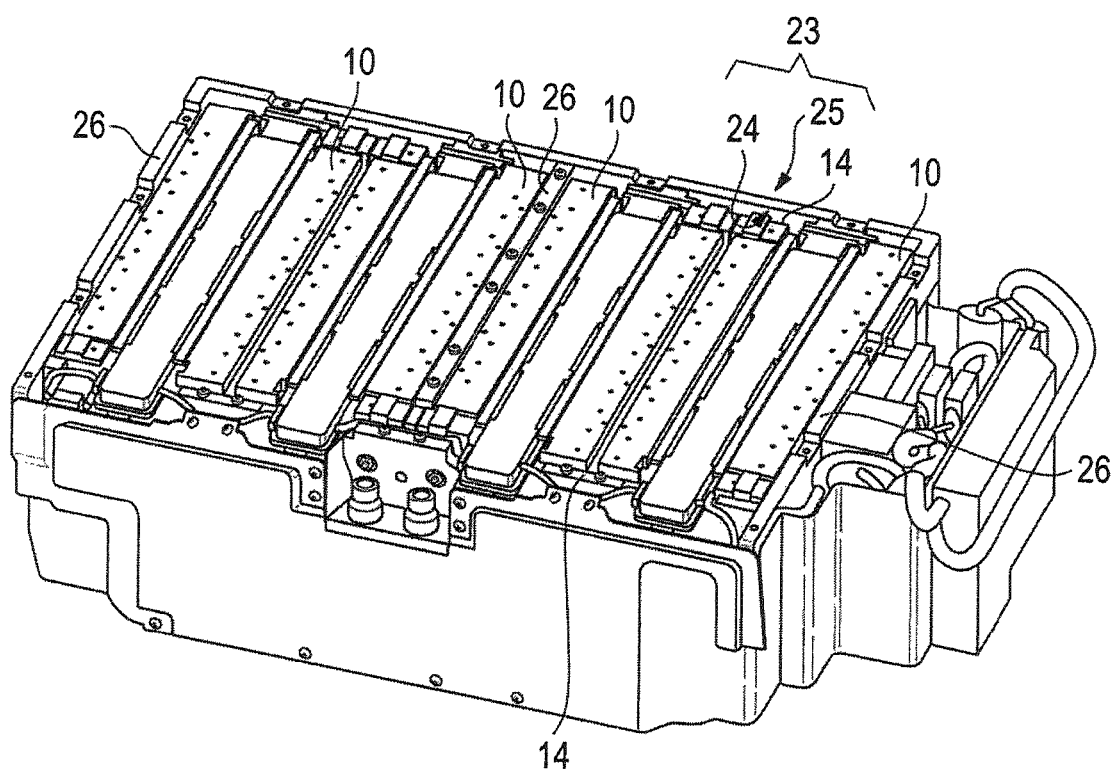
FIG. 4 is a perspective view of a motor vehicle battery.

FIG. 4 shows a perspective view of a partially open motor vehicle battery. The motor vehicle battery comprises a housing 23 in which a plurality of battery modules 10 are accommodated in two layers of four battery modules 10 are positioned one above the other. Each battery module 10 has a multiplicity of individual battery cells 11. Each layer of the battery modules 10 is accommodated in the battery housing 23, which, in the exemplary embodiment, is formed by an inner housing 24 and an outer housing 25.

The outer housing 25 may optionally be omitted. In this case, the housing 23 is formed exclusively by the inner housing 24.

In the variant of FIG. 4, the individual battery modules 10 of the motor vehicle battery are fastened to the walls 14 of the inner housing 24 of the battery housing 23. The deformation elements 15 fasten the individual battery modules 10 indirectly to the housing walls 14 that extend transversely with respect to the longitudinal direction of a motor vehicle in the fitted state of the motor vehicle battery. Further housing walls 26 extend in the longitudinal direction of the motor vehicle and, together with the housing walls 14, define the inner housing 24 of the battery housing 23.

What is claimed is:

1. A motor vehicle battery, comprising:
a battery housing having opposite first and second battery housing walls extending in a longitudinal direction;
at least one battery module mounted between the first and second battery housing walls, the at least one battery module having opposite first and second longitudinal battery module walls substantially parallel to the opposite first and second battery housing walls and opposite first and second lateral battery module walls extending between the first and second longitudinal battery module walls;
a plurality of battery cells disposed in the battery module; and
a first deformation elements positioned between the first longitudinal battery module wall and the first battery housing wall, and a second deformation element positioned between the second longitudinal battery module wall and the second battery housing wall, the first and second deformation elements configured for indirectly fastening the battery module to the battery housing, each of the first and second deformation elements having a trough-shaped cross section with a base wall opposed to the respective first and second longitudinal battery module walls and opposed side walls extending from the base wall, the base wall of each of the first and second deformation elements being engaged releasably with one of the first and second battery housing walls respectively, and the opposed side walls of each of the first and second deformation elements engaged non-releasably to locations on the respective first and second longitudinal battery module walls substantially adjacent the lateral battery module walls, so that a clearance is formed between the base wall of the respective deformation element and the respective longitudinal battery module wall at all locations between the side walls of the respective deformation element for accommodating deformation of the deformation elements in the event of a collision.

2. The motor vehicle battery of claim 1, wherein the base wall of the respective deformation element is fastened to the respective wall of the battery housing or of the bodywork structure via bolts.

3. The motor vehicle battery of claim 2, wherein the side walls of the respective deformation element are welded to the respective longitudinal battery module wall of the respective battery module.

4. The motor vehicle battery of claim 1, wherein the base wall of each of the deformation elements extends transversely with respect to a longitudinal direction of the motor vehicle.

5. The motor vehicle battery of claim 1, wherein the battery is a traction battery of a hybrid vehicle or of an electric vehicle.

6. The motor vehicle battery of claim 1, wherein each of the side walls has a first section extending substantially perpendicularly from the base wall toward the battery module and a second section extending from the first section and aligned substantially parallel to the base wall.

7. The motor vehicle battery of claim 6, wherein the base wall is substantially planar.

* * * * *